United States Patent
Chauhan

(10) Patent No.: US 11,895,035 B2
(45) Date of Patent: Feb. 6, 2024

(54) QUALITY OF EXPERIENCE (QOE) OPTIMIZATION OF DEVICE AND NETWORK CONFIGURATION

(71) Applicant: T-Mobile USA, Inc., Bellevue, WA (US)

(72) Inventor: Kanakrai Chauhan, Snoqualmie, WA (US)

(73) Assignee: T-Mobile USA, Inc., Bellevue, WA (US)

(*) Notice: Subject to any disclaimer, the term of this patent is extended or adjusted under 35 U.S.C. 154(b) by 3 days.

(21) Appl. No.: 16/989,768

(22) Filed: Aug. 10, 2020

(65) Prior Publication Data
US 2022/0045959 A1 Feb. 10, 2022

(51) Int. Cl.
| | |
|---|---|
| H04L 41/5067 | (2022.01) |
| H04L 65/80 | (2022.01) |
| H04L 47/24 | (2022.01) |
| H04L 43/0894 | (2022.01) |
| H04L 67/303 | (2022.01) |
| H04L 43/087 | (2022.01) |
| H04L 43/0888 | (2022.01) |
| H04L 67/306 | (2022.01) |
| H04L 41/0816 | (2022.01) |

(52) U.S. Cl.
CPC .......... *H04L 47/24* (2013.01); *H04L 41/5067* (2013.01); *H04L 43/087* (2013.01); *H04L 43/0888* (2013.01); *H04L 43/0894* (2013.01); *H04L 65/80* (2013.01); *H04L 67/303* (2013.01); *H04L 67/306* (2013.01); *H04L 41/0816* (2013.01)

(58) Field of Classification Search
CPC ... H04L 47/24; H04L 41/5067; H04L 43/087; H04L 43/0888; H04L 43/0894; H04L 65/80; H04L 67/303; H04L 67/306; H04L 41/0816; H04L 41/0823
USPC .......................................................... 709/228
See application file for complete search history.

(56) References Cited

U.S. PATENT DOCUMENTS

| | | | |
|---|---|---|---|
| 7,313,613 | B1 | 12/2007 | Brooking et al. |
| 2007/0192474 | A1* | 8/2007 | Decasper .............. H04L 67/306 709/223 |
| 2013/0286879 | A1* | 10/2013 | ElArabawy ....... H04W 28/0231 370/252 |
| 2015/0373574 | A1* | 12/2015 | Gordon ............... H04L 41/0896 370/252 |
| 2017/0230871 | A1* | 8/2017 | Rangaswamy ..... H04L 61/2007 |
| 2018/0048527 | A1* | 2/2018 | Ganjam .............. H04L 61/6022 |
| 2018/0309636 | A1* | 10/2018 | Strom ...................... H04L 45/02 |
| 2019/0036816 | A1* | 1/2019 | Evans ..................... H04L 45/50 |
| 2019/0364084 | A1* | 11/2019 | Huang ................ H04L 43/0888 |
| 2020/0015115 | A1* | 1/2020 | Heo ....................... H04L 69/165 |

(Continued)

*Primary Examiner* — Meng Vang

(57) ABSTRACT

This disclosure describes systems, devices, and computer-implemented methods that facilitate the modification of network configuration data within a client network to improve a Quality of Experience (QoE) metric associated with the execution of a user application on a client device. More specifically, a diagnostic controller may retrieve diagnostic data associated with the execution of a user application on a client device, determine a QoE metric associated with the execution of the user application, and generate network configuration data for delivery to the client device that improves the QoE metric, based on the diagnostic data and the QoE metric.

20 Claims, 6 Drawing Sheets

(56) References Cited

U.S. PATENT DOCUMENTS

2020/0022016 A1\* 1/2020 Fenoglio .................. H04L 41/16
2020/0322820 A1\* 10/2020 Carter ..................... H04L 43/50
2021/0075707 A1\* 3/2021 Kumar ................ H04L 41/0896
2021/0204011 A1\* 7/2021 Jain .......................... H04L 65/80

\* cited by examiner

QUALITY OF EXPERIENCE (QOE) OPTIMIZATION OF DEVICE AND NETWORK CONFIGURATION

BACKGROUND

Computing networks have become an integral part of our daily work and home lives. As the number of computing devices continually grows over time, so too has the scale and complexity of related computing networks. Importantly, increased network complexity has led to more complex network problems that impact device connectivity and diminish the quality of experience for user applications executed on computing devices.

More specifically, users of such networks can become frustrated when their connectivity or quality of experience is impacted by network problems. To date, traditional solutions focus on connectivity issues, the goal of which is to ensure that computing devices maintain a consistent connection to the computing network. Such solutions can involve telephone-based services, technician-based services such as on-site help, and self-help support. Self-help support pages may provide answers to common network problems but are less helpful for complex network problems.

While traditional solutions have had some success in resolving device connectivity issues, such solutions fall short in resolving network problems for connected client devices that encounter a reduced quality of experience for executed user applications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
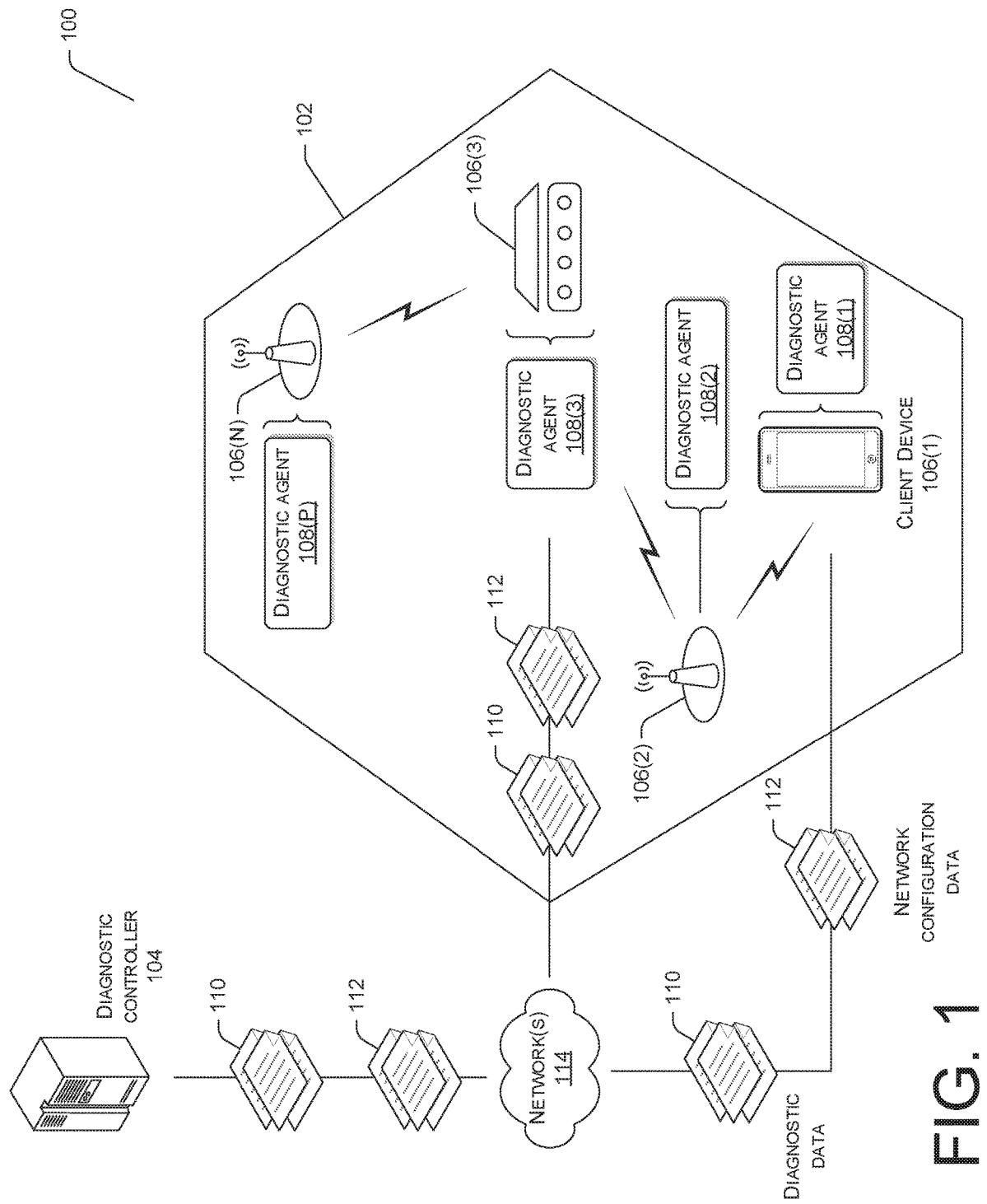
FIG. 1 illustrates a computing environment that facilitates the operation of a diagnostic controller to optimize Quality of Experience (QoE) metrics within a client network.

This disclosure describes techniques for enabling a diagnostic controller to detect and resolve network problems within a client network that may impact a user's quality of experience (QoE). QoE is a measure of a user's delight or annoyance with a service. For example, the QoE associated with streaming multimedia content may relate to buffering latency, and changes in resolution or buffering latency while the user physically moves through a service area of a client network. In other words, rather than focusing on technical service measures, such as available bandwidth and throughput, QoE is the holistic measure of service experience.

More specifically, this disclosure describes techniques for monitoring a user's experience while executing an application on the user device. The monitoring activity may be performed by a diagnostic agent that resides on the user device or is accessible via the user device. The diagnostic agent may be configured to capture diagnostic data associated with user application(s) executed via the user device. Diagnostic data may relate to an operation of the client device, such as active communication protocol(s), inactive but available communication protocol(s), uplink throughput, downlink throughput, real-time bitrate, and network latency. Alternatively, or additionally, diagnostic data related to the execution of user application(s) via the user device, such as a buffering latency or jitter index of multimedia content executed via a streaming application. Moreover, diagnostic data may also include a record of keystrokes or user-interface selections during the execution of the user application(s).

The diagnostic agent may transmit diagnostic data to a diagnostic controller via one or more network(s). The transmission of diagnostic data may occur continuously, per a predetermined schedule, or in response to a triggering event. The predetermined schedule may be based on a time interval of one minute, five minutes, 30 minutes, or one hour. Any time interval is possible. The triggering event may be based on the execution of the user application on the client device. In any event, the time interval for the predetermined schedule and the triggering event may be configurable by an administrator of the diagnostic controller or user of the client device associated with the diagnostic agent.

Upon receipt of diagnostic data, the diagnostic controller may analyze the diagnostic data to determine a QoE metric associated with the execution of the user application via the client device. The diagnostic controller may employ one or more machine learning algorithms to calculate the QoE metric. The QoE metric may be based on a weighted function of different types of diagnostic data, such as uplink throughput, downlink throughput, real-time bitrate, buffering latency, jitter indices. The weighting of each diagnostic data component may be based on a client profile of the user device or a network profile of the client network. In a first example, the client profile may be configured to rank each user application based on a usage priority. Similarly, the client profile may indicate specific preferences for individual user applications, such as a preference for low buffering latency or high multimedia content resolution. In these examples, the diagnostic data associated low buffering latency (i.e. buffer latency, jitter indices, real-time bitrate, and/or so forth) and multimedia content resolution (i.e. downlink throughput, real-time bitrate, and/or so forth) may receive a higher weighting relative to other diagnostic data components.

The QoE metric may alpha-numeric (i.e. 0 to 10, or A to F), descriptive (i.e. low, medium, or high), based on color (i.e. red, yellow, or green), or any other suitable rating scale. A high QoE metric (i.e. 7 to 10, high, or green) may reflect a measure of user delight. A low QoE metric (i.e. 1 to 3, low, or red) may reflect a measure of user annoyance with the execution of a user application. A medium QoE metric (i.e. 4 to 6, medium, or yellow) may reflect user ambivalence.

The diagnostic controller may analyze the QoE metric relative to a predetermined QoE threshold to determine whether the user experience is above or below a user's expectations. User expectations may be set by preferences gleaned from a client profile associated with the client device. Otherwise, user expectations may be set by monitoring user activity during the execution of the user application on the client device. For example, if the diagnostic controller determines that a user is continually attempting to refresh buffering multimedia content, or attempts to change audio and/or video resolution of real-time multimedia content, the diagnostic controller may infer a low QoE metric (i.e. an annoying user experience), or at best, a medium QoE metric (i.e. an ambivalent user experience). In these instances, the diagnostic controller may generate network configuration data that is configured to improve the QoE metric to at least a medium level.

In various examples, the network configuration data may be configured to implement change within the client network to improve the QoE metric. Change may be implemented via a configuration setting of the user application on the client device, a configuration setting of the client device itself, or a configuration setting of another intermediary network device within the client network.

By way of example, configuration settings of a user application may relate to QoE characteristics, such as video and/or audio resolution bitrates, display aspect ratios, that functionally depend upon network resources. Configuration settings for the client device itself may include prioritizing the allocation of network resources to support specific user applications over other user applications on the client device, selecting a more-effective communication protocol, and/or so forth. Configuration settings for the network device, such as a communications router, may include prioritizing the allocation of network resources to support specific client devices over other client devices within the client network, selecting more-effective communication protocol(s), and/or so forth.

The diagnostic controller may generate computer-executable instructions that automatically execute changes to the client network that are based on the network configuration data. In this way, the QoE metric of a user application may be unobtrusively improved without requiring user intervention. Alternatively, the diagnostic controller may generate a recommendation for display on the client device that describes the proposed change to the client network to improve a QoE metric. Here, the recommendation may be accompanied with selectable options to ignore or implement the recommendation. Upon user selection to implement the change, the diagnostic controller may generate computer-executable instructions that execute the changes to the client network.

The network configuration data may prioritize the allocation of network resources to support the client device, instead of other active client devices within the client network. Prioritization of network resources may be based on an analysis of competing priorities between client devices active within the client network. For example, the diagnostic controller may infer a priority based on a network profile of the client network. The network profile may rank each client device based on a network priority allocated by a network administrator or inferred by analyses of network traffic over a predetermined time interval. For example, some client devices may perform routine background updates or check-ins as part of their normal operation. By way of example, the Internet of Things (IoT) devices may routinely check-in with their respective controllers to report sensor data. While individual check-ins typically consume a small amount of bandwidth, multiple IoT devices operating simultaneously may, in aggregate, consume enough network bandwidth to impact the operation of other client devices. In this instance, the diagnostic controller may infer a pattern of routine check-ins and background updates of some client devices, and in doing so, prioritize network resources for client devices seeking bandwidth to execute a user application.

Moreover, network configuration data may prioritize the allocation of network resources to a specific user application on a client device over other user applications being executed on the client device. In this example, the diagnostic controller may analyze diagnostic data associated with the client device relative to a client profile of the client device. As mentioned earlier, the client profile may be configured to rank user applications relative to one another, based on a user-assigned preference or based on an inferred pattern of usage over a predetermined time interval.

Further, network configuration data may include computer-executable instructions that automatically change a current communication protocol used by a client device to an unused, but available, communication protocol. In this example, the diagnostic controller may determine a set of available communication protocols shared between the client device and communications transceiver. The communications transceiver in this example is located within the client network and is used to execute a user application on the client device. In this way, the diagnostic controller may determine whether a change in communication protocol is likely to improve the QoE metric of the user application executed on the client device.

In a non-limiting example, consider a user attempting to stream multimedia content via a streaming application on their client device. By default, the client device may use a Wi-Fi communication protocol for communications with a multimedia streaming device, such as a set-top box. The multimedia streaming device may in turn use a Wi-Fi communication protocol for communications with a Wi-Fi router within the client network for access to the internet. In this example, the diagnostic controller may determine that the client device and the multimedia streaming device are capable of using an alternate communication protocol, such as Bluetooth or ZigBee. If the initial QoE metric for streaming the multimedia content via the Wi-Fi communication protocol is less than a predetermined QoE threshold, the diagnostic controller may infer an alternate QoE metric for streaming the multimedia content via the alternate communication protocol(s). If the alternate QoE metric is greater than the initial QoE metric (i.e. Wi-Fi communication), the diagnostic controller may generate network configuration data that causes the client device to use the alternate communication protocol for communications with the multimedia streaming device.

As discussed earlier, the diagnostic controller may generate network configuration data based on information from a client profile associated with the client device. The client profile may be based on monitored events over a predetermined time interval. For example, the diagnostic controller may monitor the execution of individual user applications on the client device via a diagnostic agent that resides on the client device. The diagnostic agent may be configured to transmit diagnostic data to the diagnostic controller. Diagnostic data may include a date stamp and time stamp that user applications are accessed and used, indications of buffer latency, jitter indices, audio and/or video resolution of streaming content, downlink throughput, uplink throughput, communication protocol(s) used, established connections with interacting devices, such as wi-fi routers, multimedia streaming devices, and/or so forth.

The diagnostic controller may use one or more machine learning models to generate a client profile for the client device based on the diagnostic data over the predetermined time interval. The diagnostic controller may receive the diagnostic data continuously or based on a predetermined schedule set by an administrator of the diagnostic controller or user of the client device. As more diagnostic data becomes available, the diagnostic controller may update the network profile to improve its real-time accuracy.

In various examples, the diagnostic controller may generate a client profile that indicates the frequency that individual user applications are accessed by the client device, the date of use, time of use, and duration of use. Additionally, the diagnostic controller may infer, and the client profile may record, a preference ranking of individual applications executed via the client device. The preference ranking may be based on a user's pattern of usage over a predetermined time interval. The diagnostic controller may use the preference ranking to prioritize the allocation of network resources to a specific user application over other user applications on the client device.

Moreover, the diagnostic controller may generate, and the client profile may record, QoE metrics for each instance that an individual user application is used on the client device. Doing so will permit the diagnostic controller to infer a QoE metric threshold for individual user applications based on a user's historical usage over the predetermined time interval.

Further, the diagnostic controller may generate, and the client profile may record, a geolocation of the client device within the client network while accessing individual user applications. The diagnostic controller may infer the geolocation of the client device based on relative signal strengths between the client device and other communication devices within the client network (i.e. routers, multimedia streaming device, and/or so forth). In this way, the diagnostic controller may correlate using the client profile to recommend changes to network topology to improve a QoE metric of a user application executed on the client device. For example, if a user typically streams multimedia content on a client device that is located in a room appreciably distant from a router or multimedia streaming device, the diagnostic controller may recommend moving the client device, the router, or the multimedia streaming device.

The diagnostic controller may also generate a network profile for the client network based on diagnostic data from multiple client devices within the client network. Unlike the client profile, the network profile is intended to focus on network performance, network workload, and network congestion within the client network over a predetermined time interval. In various examples, the diagnostic controller may generate the network profile based on diagnostic data used to generate the client profiles, the client profiles themselves, or a combination of both. In other words, the network profile may be based on the same diagnostic data components as used for the client profile.

The network profile may use QoE metrics gleaned from the client device(s), and also generate Quality of Service (QoS) metrics, such as latency, jitter, bitrate, and data throughput. It is noteworthy that while QoS may share the same, or similar, diagnostic data components as QoE metrics, the focus of QoS is service capability and delivery, whereas the focus of QoE is a holistic user experience.

The network profiles may provide the diagnostic controller with a platform to recommend changes to network topology in response to a QoE metric falling below a predetermined QoE threshold. One or more trained machine learning algorithms to infer changes to network topology. Doing so ensures that any change to network topology to improve the QoE metric associated with one client device does not negatively impact another client device within the client network.

Moreover, the diagnostic controller may use a network profile to prioritize the allocation of network resources to one client device over another. As discussed earlier, some client devices may perform routine background updates or check-ins as part of their normal operation. While individual check-ins typically consume a small amount of bandwidth, multiple device check-ins operating simultaneously may, in the aggregate, consume enough network bandwidth to impact the operation of other client devices. In this instance, the diagnostic controller may correlate real-time network activity with a network profile to infer whether routine check-ins and background updates of some client devices are taking place. If so, the diagnostic controller may de-prioritize an allocation of network resources for client devices implementing such activities and prioritize the allocation of network resources for client devices seeking to execute user applications.

In various examples, the diagnostic controller may use one or more machine-learning algorithms to generate a meta statistical-model that combines individual client profiles of client devices with a network profile of the client network. In this way, the diagnostic controller may leverage client profile data and network profile data when generating inferences to support network configuration data.

Further, the term "techniques," as used herein, may refer to system(s), method(s), computer-readable instruction(s), module(s), algorithms, hardware logic, and/or operation(s) as permitted by the context described above and through the document.

FIG. 1 illustrates a computing environment that facilitates the operation of a diagnostic controller to optimize Quality of Experience (QoE) metrics within a client network. The computing environment 100 may include a client network 102 and a diagnostic controller 104 that interacts with client device(s) 106(1)-106(N) within the client network 102.

The client network 102 may overlay a geographic area to provide Radio Frequency (RF) signal coverage that supports an operation of client device(s) 106(1)-106(N). The client network 102 may overlay a geographic area such as a residential home, an office building, a segmented portion of an office building, or any other geographic area where RF signal coverage supports the operation of client device(s) 106(1)-106(N).

In the illustrated examples, the diagnostic controller 104 may be configured to receive diagnostic data 110 from client device(s) 106(1)-106(N) within the client network 102. More specifically, diagnostic agent(s) 108(1)-108(P) that reside on the client device(s) 106(1)-106(N), may be configured to interact with the diagnostic controller 104 to transmit diagnostic data 110 and receive network configuration data 112. The diagnostic data 110 may include a date stamp and time stamp that user applications are accessed and used, indications of buffer latency, jitter indices, audio and/or video resolution of streaming content, downlink throughput, uplink throughput, communication protocol(s) used, established connections with interacting devices, such as Wi-Fi routers, multimedia streaming devices, and/or so forth.

In response to receipt and analysis of diagnostic data 110 from the client device(s) 106(1)-106(N), the diagnostic controller 104 may transmit generate and transmit network configuration data 112 to select client device(s) 106(1)-106(N) within the client network 102. The network configuration data 112 may include proposed client device-level and proposed network-level changes to the select client device(s) 106(1)-106(N) within the client network 102. In some examples, the diagnostic controller 104 may transmit recommendations to client device(s) 106(1)-106(N) instead of the network configuration data 112. The recommendations are intended to inform users of proposed client device-level changes or proposed network-level changes and request their acquiescence to implement the proposed change or ignore the proposed change. In response to receipt of a response to implement a proposed recommendation, the diagnostic controller 104 may generate and transmit corresponding network configuration data 112.

The diagnostic controller 104 may be communicatively coupled to client device(s) 106(1)-106(N) within the client network 102 via one or more network(s) 114. In other examples, the diagnostic controller 104 may reside within the client network 102. The one or more network(s) 114 may include public networks such as the Internet, private networks such as an institutional and/or personal intranet, or some combination of private and public network(s). The one or more network(s) can also include any type of wired and/or wireless network, including but not limited to local area network (LANs), wide area network(s) (WANs), satellite networks, cable networks, Wi-Fi networks, Wi-Max networks, mobile communications networks (i.e. 5G-NR, LTE, 3G, 2G), or any combination thereof.

The diagnostic controller 104 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the client device(s) 106(1)-106(N) via one or more network(s) 114.

Moreover, the client device(s) 106(1)-106(N) may include any sort of electronic device, such as a television unit, a multimedia streaming device, a cellular phone, a smartphone, a tablet computer, an electronic reader, a media player, a gaming device, a personal computer (PC), a laptop computer, etc. The client device(s) 106(1)-106(N) may also include network devices that act as intermediaries between the client device(s) 106(1)-106(N) that execute user applications and the Internet. It is noteworthy that the Internet is accessible via the one or more network(s) 114. In some examples, the client device(s) 106(1)-106(N) may include a subscriber identity module (SIM), such as an eSIM, to identify the client device(s) 106(1)-106(N) to a telecommunication service provider (also referred to herein, as "telecommunications network").

Figure 2:
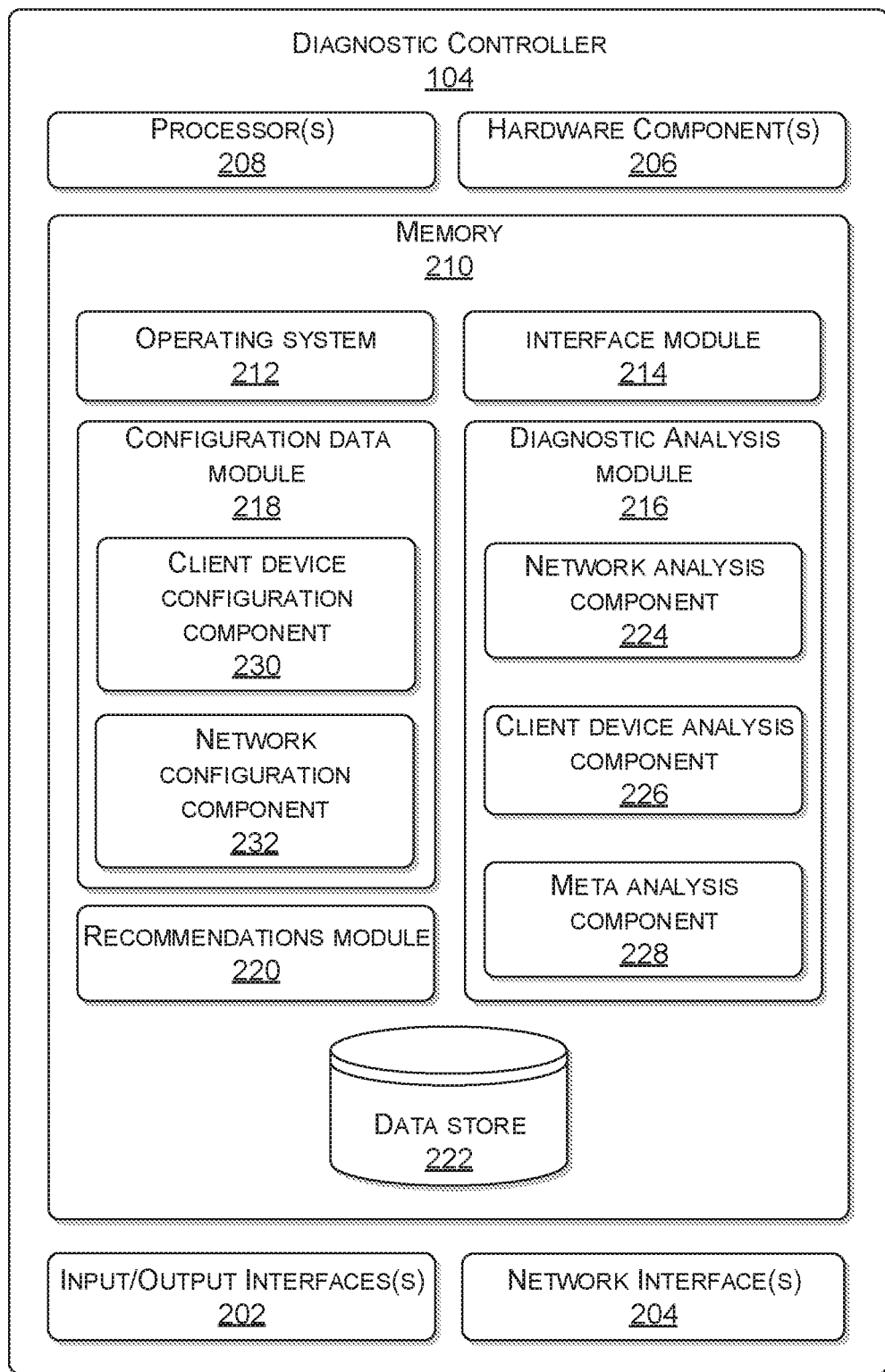
FIG. 2 illustrates various components of a diagnostic controller that is configured to detect and resolve network problems within a client network that may impact a user's quality of experience (QoE).

FIG. 2 illustrates various components of a diagnostic controller that is configured to detect and resolve network problems within a client network that may impact a user's quality of experience (QoE). The diagnostic controller 104 may be configured to retrieve diagnostic data from a client device within a client network, determine a QoE metric associated with a user application executed on the client device, and generate network configuration data that implements a change within the client network to improve the QoE metric.

The diagnostic controller 104 may include input/output interface(s) 202. The input/output interface(s) 202 may include any type of output interface known in the art, such as a display (e.g. a liquid crystal display), speakers, a vibrating mechanism, or a tactile feedback mechanism. Input/output interface(s) 202 also include ports for one or more peripheral devices, such as headphones, peripheral speakers, or a peripheral display. Further, the input/output interface(s) 202 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the diagnostic controller 104 may include network interface(s) 204. The network interface(s) 204 may include any sort of transceiver known in the art. For example, the network interface(s) 204 may include a radio transceiver that performs the function of transmitting and receiving radio frequency communications via an antenna. Also, the network interface(s) 204 may include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 204 may include wired communication components, such as an Ethernet port or a Universal Serial Bus (USB). Hardware component(s) 206 may include additional hardware interface, data communication hardware, and data storage hardware.

Further, the diagnostic controller 104 may include one or more processor(s) 208 that are operably connected to memory 210. In at least one example, the one or more processor(s) 208 may be a central processing unit(s) (CPU), graphics processing unit(s) (GPU), or both a CPU and GPU or any other sort of processing unit(s). Each of the one or more processor(s) 208 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 208 may also be responsible for executing all computer applications stored in the memory, which can be associated with common types of volatile (RAM) and/or non-volatile (ROM) memory.

In some examples, memory 210 may include system memory, which may be volatile (such as RAM), non-volatile (such as ROM, flash memory, etc.), or some combination of the two. The memory may also include additional data storage devices (removable and/or non-removable) such as, for example, magnetic disks, optical disks, or tape.

The memory 210 may further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 210 may include an operating system 212, interface module 214, a diagnostic analysis module 216, configuration data module 218, a recommendations module 220, and a data store 222. The operating system 212 may be any operating system capable of managing computer hardware and software resources. The operating system 212 may include an interface layer that enables applications to interface with the input/output interface(s) 202 and the network interface(s) 204.

The interface module 214 is configured to interact with one or more client device(s) 106(1)-106(N) within the client network 102. The interface module 214 may be configured to receive diagnostic data 110 from the client device(s) 106(1)-106(N) within the client network 102. The interface module 214 may pull diagnostic data 110 continuously or per a predetermined schedule. Alternatively, the client device(s) 106(1)-106(N) may push the diagnostic data 110 to the diagnostic controller 104, which in turn, is received at the interface module 214. Diagnostic data 110 may be pushed to the interface module 214 continuously, per a predetermined schedule, or in response to a triggering event. The triggering event may be the execution of a user application on the client device(s) 106(1)-106(N).

The diagnostic analysis module 216 may further include a network analysis component 224, a client device analysis component 226, and a meta-analysis component 228. The network analysis component 224 may interact with the interface module 214 to received diagnostic data 110, and in doing so, employ one or more machine-learning algorithms to generate a network profile for the client network. In some examples, the network analysis component 224 may also retrieve and analyze a client profile from the client device analysis component 226, to identify, among other things, geolocations within the client network that are vulnerable to poor network service performance. As such, the network profile may be configured to reflect network service performance at different geolocations within the client network. The network profile may include Quality of Service (QoS) metrics, such as latency, jitter, bitrate, and data throughput, and/or so forth.

The network analysis component 224 may develop a network profile based on historical instances of diagnostic data retrieved from the client network over a predetermined time interval. As more diagnostic data becomes available, the network analysis component 224 may update the network profile to improve its real-time accuracy.

The network analysis component 224 may further employ one or more machine learning algorithms to analyze real-time diagnostic data from client devices within the client network. The analysis may be based on a comparison of QoS metrics, QoE metrics, or a combination of both, relative to corresponding predetermined thresholds. Alternatively, or additionally, the analysis may be relative to the network profile. In this way, the network analysis component 224 may infer whether to implement network-level changes to improve QoE metrics of user application(s) executed via the client device(s). It is noteworthy that QoS metrics and QoE metrics share similar diagnostic data components. However, QoS metrics focus on network service delivery, whereas QoE metrics focus on the holistic aspect of user experience, as delivered by the client network.

The one or more trained machine-learning algorithms may include but are not limited to algorithms such as supervised learning, unsupervised learning, semi-supervised learning, naive Bayes, Bayesian networks decision trees, neural networks, fuzzy logic models, multiclass decision forest, and/or probabilistic classification.

The client device analysis component 226 may interact with the interface module 214 to received diagnostic data 110, and in doing so, employ one or more machine-learning algorithms to generate a client profile for a client device operating within the client network. The client profile may be configured to identify user applications executed on the client device within the client network and any user preferences associated with the user applications (i.e. buffering latency, multimedia content resolution, and/or so forth). User applications may be ranked based on usage priority. The client profile may further associate geolocations within the client network from which user applications are executed on the client device. This additional data point may assist the network analysis component 224 in identifying geolocations within the client network that are vulnerable to poor network service performance.

The client profile may include the Quality of Experience (QoE) metrics for user applications executed via the client device on the client network. The QoE metrics may correspond to a weighted function of different types of diagnostic data, such as uplink throughput, downlink throughput, real-time bitrate, buffering latency, jitter indices. The weighting function of each diagnostic component is a function of the importance and relevance of the diagnostic component in executing the user application on the client device while maintaining a threshold QoE, and the importance and relevance of the user application to itself, based on usage priority. For example, buffering latency and downlink throughput are weighted highly for a real-time multimedia streaming application. As such, the weighting of each diagnostic component may be based on a client profile of the client device or a network profile of the client network.

The client device analysis component 226 may develop a client profile based on historical instances of diagnostic data retrieved from the client network over a predetermined time interval. As more diagnostic data becomes available, the client device analysis component 226 may update the client profile to improve its real-time accuracy.

The client device analysis component 226 may further employ one or more machine learning algorithms to analyze real-time diagnostic data from a client device within the client network. The analysis may be based on a comparison of QoE metrics relative to a corresponding predetermined QoE threshold. Alternatively, or additionally, the analysis may be relative to a corresponding client profile. In this way, the client device analysis component 226 may infer whether to implement changes to the client device or client network, in order to maintain a predetermined QoE threshold.

The meta-analysis component 228 may be configured to combine individual client profiles of client devices with a network profile of the client network. In this way, the diagnostic controller may leverage client profile data and network profile data when generating inferences to support network configuration data.

The configuration data module 218 may further include a client device configuration component 230 and a network configuration component 232. The client device configuration component 230 may interact with the diagnostic analysis module 216 to generate network configuration data for delivery to a client device within the client network. The network configuration data may include computer-executable instructions that automatically execute client device-level changes to a client device. By way of example, the network configuration data may include a change to a configuration setting of the client device itself (i.e. allocation network resource to support a specific user application over other user applications or a change in communication protocol), or a configuration setting of another intermediary network device within the client network (i.e. change in communication protocol).

The network configuration component 232 may interact with the diagnostic analysis module 216 to generate network configuration data for delivery to one or more client device(s) within the client network. The network configuration data may include computer-executable instructions that automatically execute network-level changes to the client device(s) within the client network. By way of example, the network configuration data may include changes to client network settings (i.e. communication protocol(s) used, port IDs) or prioritizing the allocation of network resources to support specific client device(s) or specific user applications executed on the client device(s).

The recommendations module 220 may be configured to interact with the configuration data module 218 to generate recommendations for delivery to a client device associated with the client network. Recommendations may relate to proposed client device-level and network-level changes derived by the configuration data module 218. By way of example, recommendations may include changes to network settings (i.e. communication protocol(s) used), or changes to network topology, such as moving a client device (i.e. intermediary network device, router, or multimedia streaming device).

The recommendations module 220 may generate a recommendation that includes selectable options to implement or ignore the proposed change. In response to receipt of an indication to implement a proposed change, the diagnostic controller 104, via the configuration data module 218 may generate network configuration data to implement the proposed change.

The data store 222 may include a repository of client profiles, network profiles, generated over predetermined time intervals. The data store 222 may also include historical instances of diagnostic data gleaned from client devices over predetermined time intervals, and any other data pertinent to an operation of the diagnostic controller 104.

Figure 3:
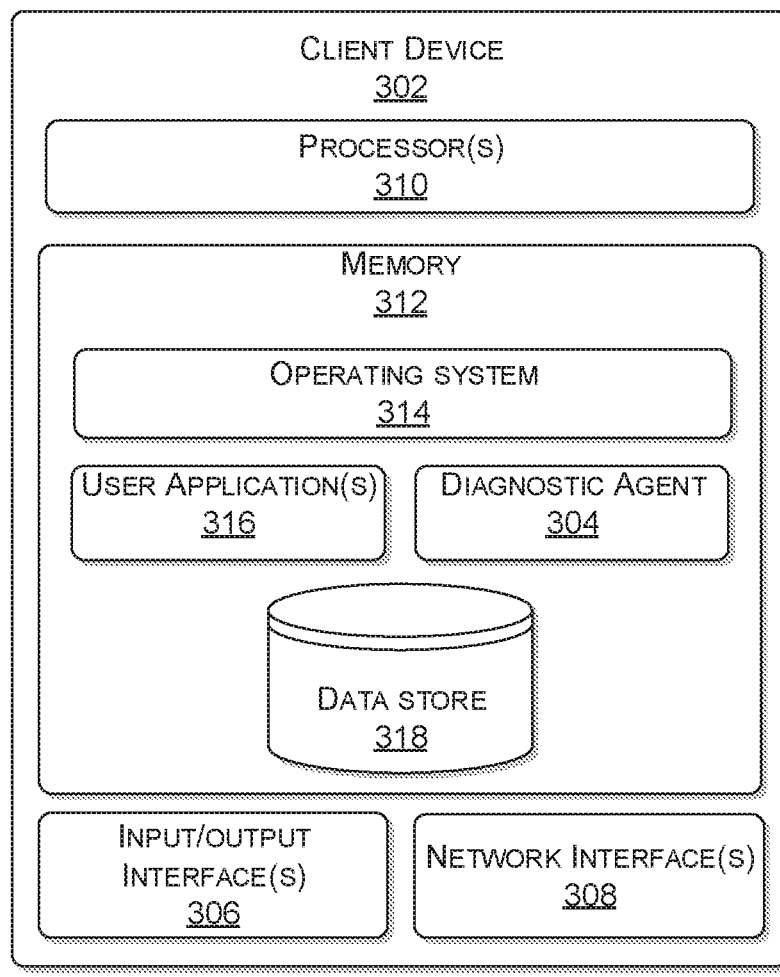
FIG. 3 illustrates various components of a client device operating within the client network.

FIG. 3 illustrates various components of a client device with a diagnostic agent operating within the client network. The client device 302 may be similar to one of the client device(s) 106(1)-106(N). Further, the diagnostic agent 304 may be similar to one of the diagnostic agent(s) 108(1)-108(P). The diagnostic agent 304 may be configured to monitor the execution of user application(s) via a client device and capture corresponding diagnostic data for analysis via the diagnostic controller 104. The diagnostic agent 304 is further configured to interact with the diagnostic controller 104 to receive network configuration data, recommendations, and pull requests for diagnostic data.

The client device 302 may include input/output interface(s) 306 and network interface(s) 308. The input/output interface(s) 306 may be similar to input/output interface(s) 202, and the network interface(s) 308 may be similar to network interface(s) 204.

The client device 302 may include one or more processor(s) 310 that are operably connected to memory 312. The one or more processor(s) 310 may be similar to the one or more processor(s) 208, and the memory 312 may be similar to the memory 210.

The memory 312 may include an operating system 314, user application(s) 316, a diagnostic agent 304, and a data store 318. The operating system 314 may be any operating system capable of managing computer hardware and software resources. The operating system 314 may include an interface layer that enables applications to interface with the input/output interface(s) 306 and the network interface(s) 308.

User application(s) 316 may include any application executable via the client device 302. The user application(s) 316 may reside in the memory 312 of the client device 302 or reside on a separate server that is remotely accessible by the client device 302. By way of example, the user application(s) 316 may include a streaming application for multimedia content, a social networking application for real-time text, audio, and/or visual communication between client devices, or any other application that relies on data throughput via the client network.

The diagnostic agent 304 may be configured to monitor and measure performance and utilization characteristics of user application(s) 316 operating on the client device 302. More specifically, the diagnostic agent 304 may capture diagnostic data associated with user application(s) 316 executed on the client device 302. The diagnostic data may include a date stamp and time stamp that user applications are accessed and used, indications of buffer latency, jitter indices, audio and/or video resolution of streaming content, downlink throughput, uplink throughput, communication protocol(s) used, established connections with interacting devices, such as wi-fi routers, multimedia streaming devices, and/or so forth.

The diagnostic agent 304 may be configured to transmit diagnostic data to the diagnostic controller 104 continuously, per a predetermined schedule, or in response to a triggering event. The predetermined schedule may correspond to any time interval and may be set by an administrator of the diagnostic controller 104 or an operator of the client device 302. Further, the triggering event may correspond to the execution of user application(s) 316 via the client device 302 or a pull request for diagnostic data that is received from the diagnostic controller 104.

Moreover, the diagnostic agent 304 may be configured to receive, from the diagnostic controller 104, recommendations to implement proposed changes to improve QoE metrics. The diagnostic agent 304 may present the recommendations along with selectable options to implement or ignore the proposed change. Additionally, the diagnostic agent 304 may execute network configuration data received from the diagnostic controller 104. The diagnostic agent 304 may automatically execute the network configuration data based on computer-executable instructions included with the network configuration data.

The data store 318 may include a repository of diagnostic data captured by the diagnostic agent 304, network configuration data and recommendations received from the diagnostic controller 104, and any other data pertinent to an operation of the client device 302 and, more specifically, the diagnostic agent 304.

Figure 4:
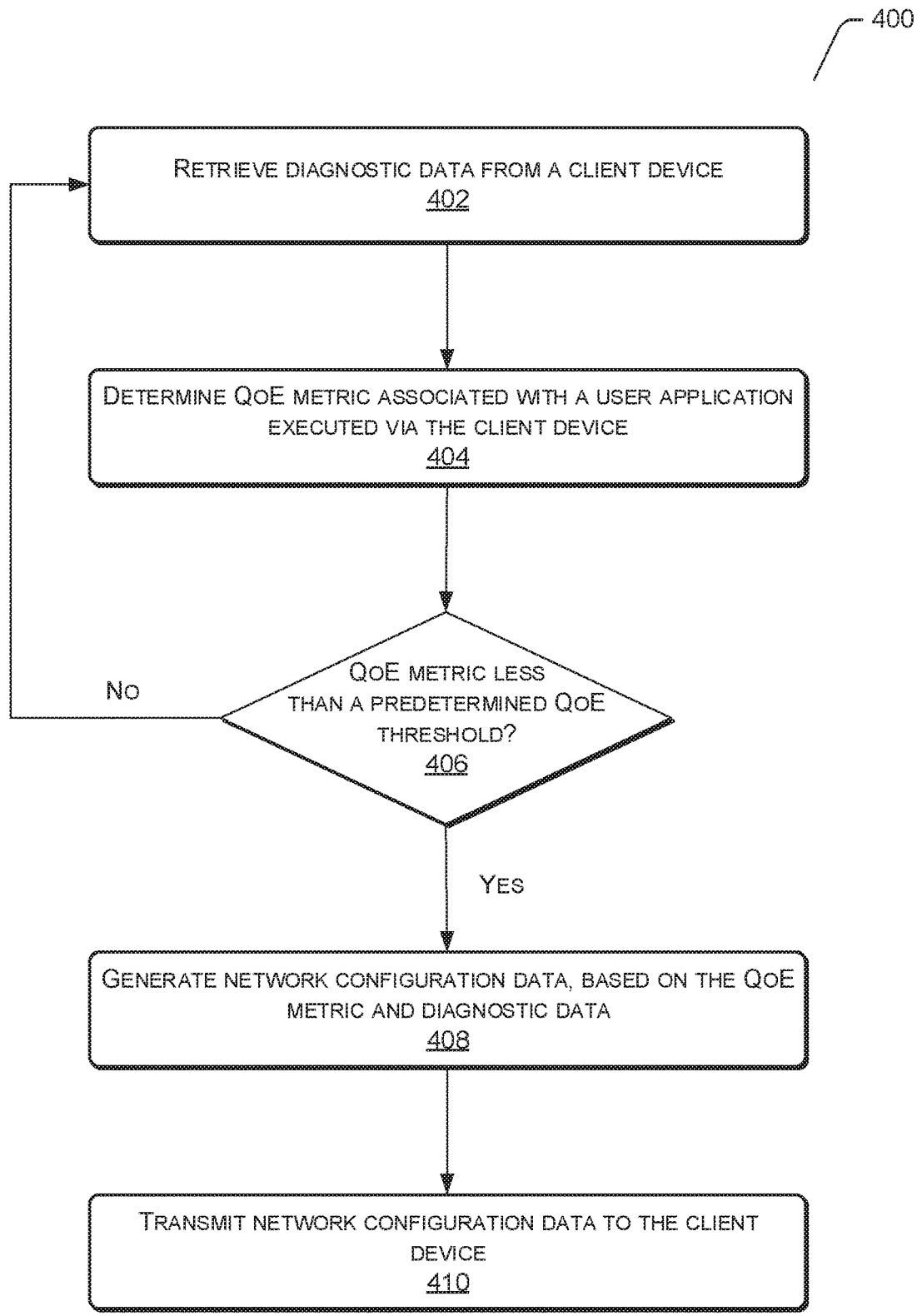
FIG. 4 illustrates a process flow for generating network configuration data for a client network based on Quality of Experience (QoE) metrics.
Figure 5:
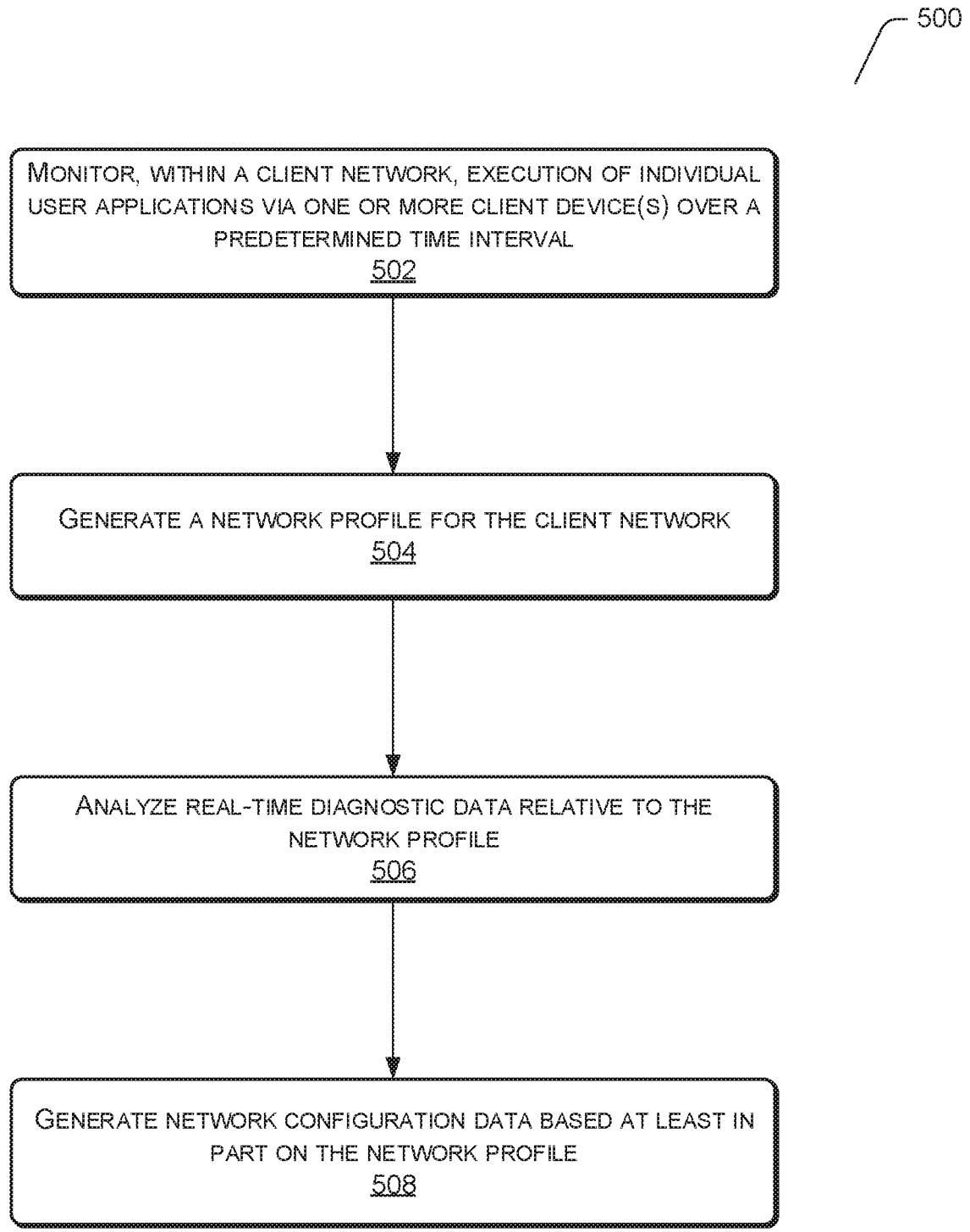
FIG. 5 illustrates a process for generating a network profile of a client network and generating network configuration data to improve QoE metrics based on the network profile.
Figure 6:
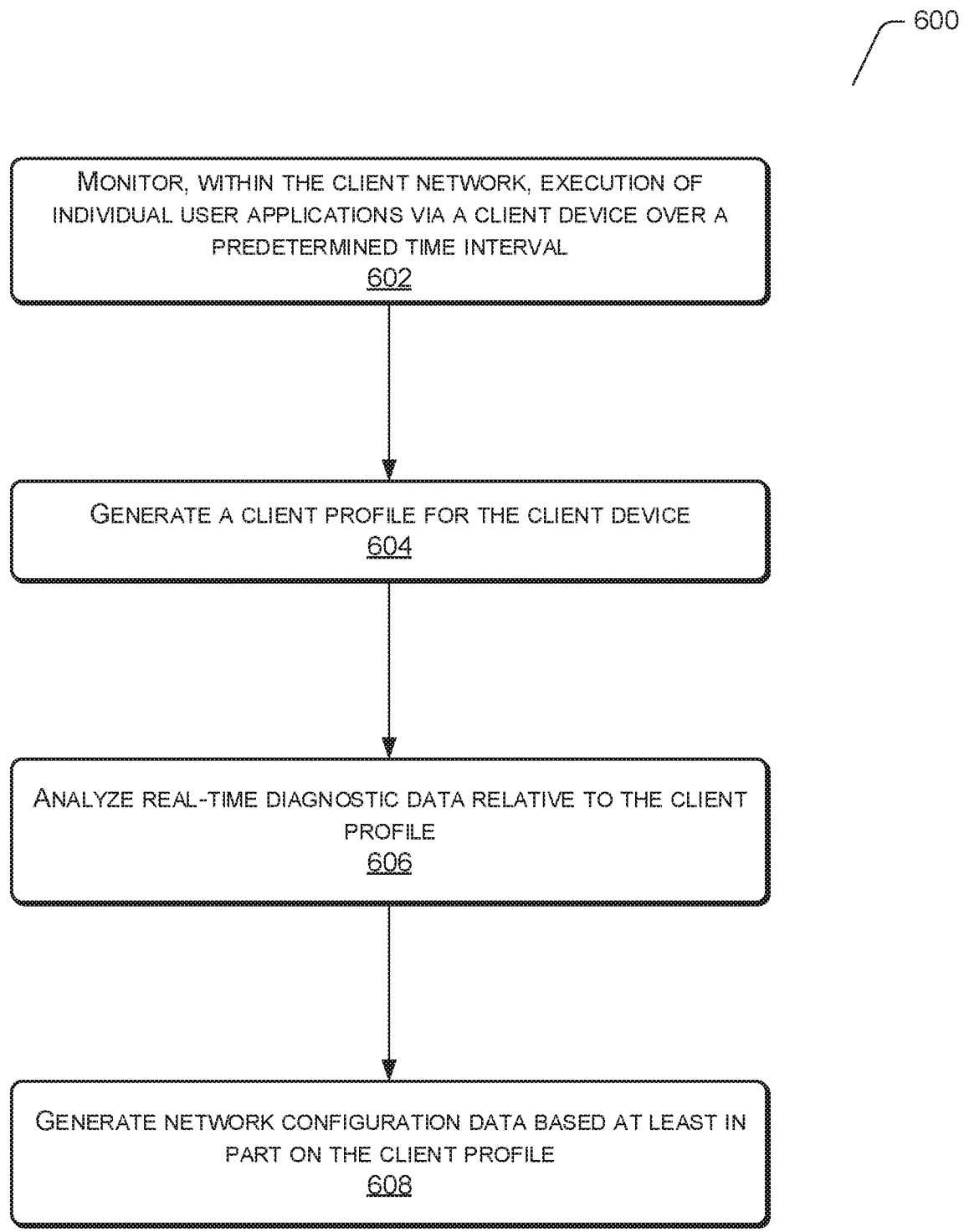
FIG. 6 illustrates a process for generating a client profile of a client device operating with the client network and generating network configuration data to improve QoE metrics based on the network profile.

FIGS. 4, 5, and 6 present processes 400, 500, and 600 that relate to operations of the diagnostic controller 104. Each of the processes 400, 500, and 600 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400, 500, and 600 are described with reference to the computing environment 100 of FIG. 1.

FIG. 4 illustrates a process flow for generating network configuration data for a client network based on Quality of Experience (QoE) metrics. Process 400 is described from the perspective of the diagnostic controller that captures diagnostic data from the client device(s) within the client network.

At 402, the diagnostic controller may retrieve diagnostic data from a client device within a client network. The diagnostic data may relate to the operation of user applications on the client device within the client network. By way of example, the user application may include a streaming application for multimedia content, a social networking application for real-time text, audio, and/or visual communication between client devices, or any other application that relies on data throughput via the client network.

The diagnostic controller may pull diagnostic data from the client device continuously, per a predetermined schedule, or in response to a triggering event. The predetermined schedule may be set by an administrator of the diagnostic controller, or a user of the client device, and may correspond to any time interval. The triggering event may correspond to the execution of a user application of the client device.

At 404, the diagnostic controller may employ one or more machine-learning algorithms to determine a Quality of Experience (QoE) metric associated with the user application executed via the client device. The QoE metric is intended to measure a user's delight or annoyance with the operation of a user application. Examples include the buffering latency of a stream of multimedia content or uplink/downlink throughput for file transfers. More specifically, the QoE metrics may correspond to a weighted function of different types of diagnostic data, such as uplink throughput, downlink throughput, real-time bitrate, buffering latency, jitter indices, etc. The weighting of each diagnostic component may be based on a client profile of the client device of a network profile of the client network.

At 406, the diagnostic controller may determine whether the QoE metric is less than a predetermined QoE threshold. The predetermined QoE threshold may be set by an administrator of the diagnostic controller or a user of the client device. Alternatively, or additionally, the predetermined QoE threshold may be based on user preferences gleaned from a client profile associated with the client device. For example, if a user is continually streaming high-resolution multimedia content, the predetermined QoE threshold may be dynamically set by the diagnostic controller to maintain a threshold experience for high-resolution multimedia content.

If the QoE metric is greater than or equal to the predetermined QoE threshold, process 400 may return to process step 402 and continue to retrieve diagnostic data from the client device. A QoE metric that is greater than or equal to the predetermined QoE threshold represents an acceptable user experience. Accordingly, changes to network configuration are not required.

At 408, in response to determining that the QoE metric is less than a predetermined threshold, the diagnostic controller may generate network configuration data to improve the QoE metric to at least the predetermined QoE threshold. In this way, the network configuration data is intended to improve the user experience to at least a threshold level of acceptability (i.e. predetermined QoE threshold).

More specifically, the diagnostic controller may employ one or more machine-learning algorithms to generate the network configuration data. In one example, the network configuration data may implement a change to a configuration setting of the user application on the client device, a configuration setting of the client device itself, or a configuration setting of another intermediary network device within the client network.

Moreover, the diagnostic controller may generate network configuration data to prioritize the allocation of network resources to support the user application executed via the client device, or to support the client device, itself. In another example, the diagnostic controller may change a current communication protocol used by the client device to an unused, but available, communication protocol.

At 410, the diagnostic controller may transmit the network configuration data to the client device. The network configuration data may include computer-executable instructions that automatically implement the network configuration data on the client device. Alternatively, the diagnostic controller may transmit a message to the client device with a recommendation that describes the proposed change associated with the network configuration data. The recommendation may include a selectable option to implement or ignore the recommendation. Upon selection to implement the recommendation, the diagnostic controller may transmit, and automatically implement—via computer-executable instructions—the network configuration data on the client device.

FIG. 5 illustrates a process for generating a network profile of a client network and generating network configuration data to improve QoE metrics based on the network profile. Process 500 is described from the perspective of the diagnostic controller that captures network performance data from the client network of a predetermined time interval.

At 502, the diagnostic controller may monitor, within a client network, execution of individual user application(s) via one or more client device(s) over a predetermined time interval. The monitoring activity may include capturing diagnostic data from a diagnostic agent that resides on each client device. The diagnostic agent may be configured to transmit diagnostic data to the diagnostic controller continuously, per a predetermined schedule set by an administrator of the diagnostic controller or user of the client device.

At 504, the diagnostic controller may employ one or more machine-learning algorithms to generate a network profile for the client network. The network profile may be configured to reflect network service performance at different geolocations within the client network. For example, if the client network was associated with a residential building, the network profile may indicate network service performance in each room of the residential building.

The network profile may include Quality of Service (QoS) metrics, such as latency, jitter, bitrate, and data throughput. It is noteworthy that QoS and QoE share similar diagnostic data components. However, QoS metrics focus on network service delivery, whereas QoE metrics focus on the holistic aspect of user experience, as delivered by the client network.

At 506, the diagnostic controller may employ one or more machine-learning algorithms to analyze real-time diagnostic data from the client device(s) within the client network relative to the network profile. In this way, the diagnostic controller may infer whether to implement network-level changes to improve QoE metrics associated with user application(s) executed via the client device(s). Network-level changes may include prioritizing the allocation of network resources to support specific client device(s) or specific user applications executed on the client device(s). Network-level changes may also comprise changes to client network settings (i.e. communication protocol(s) used, port IDs), recommendations to change network settings or recommendations to change network topology, such as moving a client device (i.e. intermediary networking device, router, or multimedia streaming device).

At 508, the diagnostic controller may generate network configuration data for delivery to one or more client device(s) based at least in part on the analysis of the network profile. The network configuration data may include computer-executable instructions that automatically execute network-level changes to the client network based on the analysis of process step 508.

Alternatively, the network configuration data may provide a recommendation that is to be displayed on a user interface of a client device in the client network. The recommendation may relate to a physical change to a network topology of the client network. The recommendation may also present selectable options to ignore or implement the proposed network-level changes. Upon user selection to implement a change, the diagnostic controller may automatically execute the change to the client network.

A recommendation to implement a physical change to network topology may include selectable options to indicate whether the change has been ignored or has been implemented. For example, if the user chooses to implement changes to the physical network topology, as recommended, the user may select the option indicating the same. In doing so, the diagnostic controller may update the network profile accordingly and automatically implement any corresponding network configuration settings on the client network. Otherwise, if the user chooses to ignore the recommendation, process 500 ends with no changes to the client network.

FIG. 6 illustrates a process for generating a client profile of a client device operating with the client network and generating network configuration data to improve QoE metrics based on the network profile. Process 600 is described from the perspective of the diagnostic controller that captures diagnostic data from client devices operating within the client network.

At 602, the diagnostic controller may monitor, within a client network, execution of individual applications(s) via a client device over a predetermined time interval. The monitoring activity may include capturing diagnostic data from a diagnostic agent that resides on each client device. The diagnostic data may include a date stamp and time stamp that user applications are accessed and used, indications of buffer latency, jitter indices, audio and/or video resolution of streaming content, downlink throughput, uplink throughput, communication protocol(s) used, established connections with interacting devices, such as wi-fi routers, multimedia streaming devices, and/or so forth.

At 604, the diagnostic controller may generate a client profile for the client device. The client profile may be configured to rank each user application used by the client device based on a usage priority. Similarly, the client profile may indicate specific preferences for individual user applications, such as a preference for low buffering latency or high multimedia content resolution. In these examples, the diagnostic data associated low buffering latency (i.e. buffer latency, jitter indices, real-time bitrate, and/or so forth) and multimedia content resolution (i.e. downlink throughput, real-time bitrate, and/or so forth) may receive a higher weighting relative to other diagnostic data components.

At 606, the diagnostic controller may employ one or more machine-learning algorithms to analyze the real-time diagnostic data from the client device relative to the client profile. In this way, the diagnostic controller may determine whether changes need to be implemented to the client device or client network, in order to maintain a predetermined QoE threshold. Changes may include a configuration setting of the user application, on the client device (i.e. multimedia resolution, display aspect ratio), a configuration setting of the client device itself (i.e. allocation network resource to support a specific user application over other user applications), or a configuration setting of another intermediary network device within the client network (i.e. change of communication protocol).

At 608, the diagnostic controller may generate network configuration data for delivery to the client device, based at least in part on the analysis of the client profile. The network configuration data may include computer-executable instructions that automatically execute the proposed changes identified in process step 606 on the client device or another intermediary network device within the client network.

Alternatively, the network configuration data may provide a recommendation for display on a user interface of the client device. The recommendation may relate to proposed changes identified in process step 606, and further present selectable options to implement or ignore the proposed changes. Upon user selection to implement a proposed change, the diagnostic controller may automatically execute the change.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A system, comprising:
one or more processors;
memory coupled to the one or more processors, the memory including one or more modules that are executable by the one or more processors to:
retrieve, within a client network, a set of diagnostic data associated with execution of a user application via a client device;
determine a Quality of Experience (QoE) metric associated with the execution of the user application based at least in part on the set of diagnostic data;
retrieve, from a data store, client profiles of a plurality of client devices operating on the client network over a predetermined time interval;
retrieve, from the data store, a network profile of the client network that denotes network performance at different geolocations within the client network over the predetermined time interval;
generate, via one or more machine-learning algorithms, a statistical model that combines the client profiles of the plurality of client devices and the network profile of the client network;
generate network configuration data that improves the QoE metric for delivery to the client device based at least in part on the statistical model that combines the client profiles of the plurality of client devices and the network profile of the client network; and deliver the network configuration data to the client device to change a configuration setting on the client device such that the client device allocates a network resource of the client network to the user application on the client device instead of another user application on the client device.

2. The system of claim 1, wherein the user application corresponds to a streaming service and wherein the client device corresponds to a multimedia streaming device or a set-top box.

3. The system of claim 1, wherein the set of diagnostic data corresponds to one or more of a buffering latency of a multimedia stream, a jitter index of the multimedia stream, a first bitrate for downlink throughput of a first data stream, or a second bitrate for uplink throughput of a second data stream.

4. The system of claim 1, wherein the QoE metric is further based at least in part on threshold values for buffering latency, jitter indices, downlink throughput, and uplink throughput.

5. The system of claim 1, wherein the one or more modules are further executable by the one or more processors to:
monitor, within the client network, execution of individual user applications on the client device over a predetermined time interval; and
generate a client profile for the client device, based at least in part on monitored events.

6. The system of claim 1, wherein the one or more modules are further executable by the one or more processors to:
monitor, within the client network, execution of individual user applications on the client devices over the predetermined time interval;
determine a network performance at the different geolocations within the client network, the network performance corresponding to individual QoE metrics associated with the execution of the individual user applications; and
generate the network profile for the client network, wherein the network profile correlates network performance with the individual user applications on the client devices.

7. The system of claim 1, wherein the one or more modules are further executable by the one or more processors to:
generate a recommendation to modify a physical network configuration of the client network to improve the QoE metric of the user application, the recommendation including at least one of a first change in geolocation of the client device or a second change in geolocation of a communication transceiver.

8. The system of claim 1, wherein the generating of the network configuration data includes generating the network configuration data based on the statistical model, the set of diagnostic data, and the QoE metric.

9. The system of claim 1, wherein the network configuration data prioritizes an allocation of network resources of the client network to the client device relative to other client devices within the client network.

10. The system of claim 1, wherein the network configuration data further prioritizes an allocation of network resources of the client network to the user application over other user applications being executed on the client device.

11. The system of claim 1, wherein the QoE metric is a first QoE metric, and wherein the one or more modules are further executable by the one or more processors to:
determine that the client device is configured to communicate via a plurality of communication protocols; and
infer that a second QoE metric associated with an unused communication protocol of the plurality of communications protocols is greater than the first QoE metric, and
wherein, the network configuration data further includes computer-executable instructions that automatically change a current communication protocol of the client device to the unused communication protocol.

12. The system of claim 1, wherein the one or more modules are further executable by the one or more processors to:
determine a set of available communication protocols for the client device to execute the user application; and
generate a recommendation to modify a current communication protocol used by the client device to execute the user application, based at least in part on the set of available communication protocols.

13. The system of claim 12, wherein the one or more modules are further executable by the one or more processors to:
identify a communications transceiver within the client network that is used to execute the user application on the client device, and
wherein, the set of available communication protocols is based at least in part on communication protocols supported by the communications transceiver.

14. A computer-implemented method, comprising:
under control of one or more processors:
monitoring execution of individual user applications on a plurality of client devices within a client network over a predetermined time interval;
generating client profiles for the plurality of client devices over the predetermined time interval based at least in part on the monitoring of the execution of the individual user applications;
determining network performance at different geolocations within the client network, the network performance corresponding to Quality of Experience (QoE) metrics of the individual user applications;
generating a network profile of the client network that denotes network performance at the different geolocations within the client network;
generating, via one or more machine-learning algorithms, a statistical model that combines the client profiles of the plurality of client devices and the network profile of the client network;
generating network configuration data for delivery to the client device based at least in part on the statistical model that combines the client profiles of the plurality of client devices and the network profile of the client network; and
delivering the network configuration data to the client device to change a configuration setting on the client device such that the client device uses an alternate communications protocol to communicate with a communications transceiver of the client network instead of a current communications protocol.

15. The computer-implemented method of claim 14, further comprising:
receiving a set of diagnostic data associated with an execution of a user application on a client device;
determining a real-time QoE metric associated with the execution of the user application; and
determining that the real-time QoE metric is less than a predetermined QoE threshold, wherein the network configuration data is configured to increase the real-time QoE metric to at least the predetermined QoE threshold.

16. The computer-implemented method of claim 14, further comprising:
identifying available communications protocols used by the client device and the communications transceiver within the client network; and
identifying the alternate communications protocol as being of the available communications protocols that is not currently used by the client device.

17. The computer-implemented method of claim 14, wherein the generating of the client profiles comprises:
generating a client profile for the client device, based at least in part on monitored events over the predetermined time interval, the monitored events being associated with an execution of individual user applications by the client device; and
determining a priority of a first user application relative to a second user application that is simultaneously executed on the client device, based at least in part on the client profile,
wherein the generating of the network configuration data is further based at least in part on the priority.

18. One or more non-transitory computer-readable media storing computer-executable instructions that upon execution cause one or more processors to perform acts comprising:
retrieving, within a client network, a set of diagnostic data associated with execution of a user application via a client device;
determining a Quality of Experience (QoE) metric associated with the execution of the user application based at least in part on the set of diagnostic data;
retrieving, from a data store, client profiles of a plurality of client devices operating on the client network over a predetermined time interval;
retrieving, from the data store, a network profile of the client network that denotes network performance at different geolocations within the client network over the predetermined time interval;
generating, via one or more machine-learning algorithms, a statistical model that combines the client profiles of the plurality of client devices and the network profile of the client network;
generating network configuration data that improves the QoE metric based at least in part on the statistical model that combines the client profiles of the plurality of client devices and the network profile of the client network; and
executing instructions included in the network configuration data at the client network, the executing the instructions causing the client network to provide a network resource to the client device instead of another client device.

19. The one or more non-transitory computer-readable media of claim 18, wherein the user application corresponds to a streaming service and wherein the client device corresponds to a multimedia streaming device or a set-top box.

20. The one or more non-transitory computer-readable media of claim 18, wherein the set of diagnostic data corresponds to one or more of a buffering latency of a multimedia stream, a jitter index of the multimedia stream, a first bitrate for downlink throughput of a first data stream, or a second bitrate for uplink throughput of a second data stream.

* * * * *